(12) United States Patent
Joco

(10) Patent No.: US 6,361,049 B1
(45) Date of Patent: Mar. 26, 2002

(54) RECESSED GROOVE/SEAL SURFACE FOR SEAL EFFECTIVENESS

(75) Inventor: Fidel M. Joco, Long Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/503,819

(22) Filed: Feb. 15, 2000

(51) Int. Cl.[7] .................................. F16J 15/02
(52) U.S. Cl. ................ 277/312; 277/614; 277/616; 277/638; 277/641; 277/910
(58) Field of Search .................. 277/312, 611, 277/614, 616, 637, 638, 641, 643, 910, 314

(56) References Cited

U.S. PATENT DOCUMENTS

| | | | |
|---|---|---|---|
| 1,715,854 A | * 6/1929 | Mckenzie-Martyn | 285/331 |
| 1,835,921 A | * 12/1931 | Woodruff | 220/240 |
| 2,298,511 A | * 10/1942 | Rathbun | 220/327 |
| 2,458,817 A | * 1/1949 | Wolfram | 285/328 |
| 2,462,596 A | * 2/1949 | Bent | 277/451 |
| 2,611,506 A | * 9/1952 | Scheer | 220/327 |
| 3,059,639 A | * 10/1962 | Blackman et al. | 604/222 |
| 3,087,370 A | * 4/1963 | Iaia | 411/369 |
| 3,173,868 A | * 3/1965 | Blomquist | 210/445 |
| 3,208,758 A | * 9/1965 | Carlson et al. | 277/638 |
| 4,165,622 A | * 8/1979 | Brown, Jr. | 64/4 |
| 4,199,157 A | 4/1980 | Skinner et al. | |
| 4,241,644 A | 12/1980 | Schertler | |
| 4,298,204 A | * 11/1981 | Jinkins | 277/641 |
| 4,303,251 A | * 12/1981 | Harra et al. | 277/614 |
| 4,395,017 A | * 7/1983 | Brautigan | 251/306 |
| 4,477,223 A | 10/1984 | Giroux | |
| 4,614,348 A | 9/1986 | Fournier | |
| 4,842,287 A | * 6/1989 | Weeks | 277/641 |
| 5,069,461 A | * 12/1991 | Orlowski | 277/303 |
| 5,112,039 A | * 5/1992 | Walker | 277/390 |
| 5,117,743 A | * 6/1992 | Yuda | 92/128 |
| 5,217,236 A | * 6/1993 | Kitamura | 277/641 |
| 5,490,680 A | * 2/1996 | Patel et al. | 277/608 |
| 5,516,122 A | 5/1996 | Caffee | |
| 5,603,511 A | 2/1997 | Keyser, Jr. et al. | |
| 5,687,975 A | * 11/1997 | Inciong | 277/591 |
| 5,803,507 A | * 9/1998 | Vu | 285/23 |

* cited by examiner

*Primary Examiner*—Anthony Knight
*Assistant Examiner*—Alison K. Picard
(74) *Attorney, Agent, or Firm*—William J. Zak, Jr., Esq.

(57) ABSTRACT

A method of sealing at least a first seal surface to a second seal surface comprises the steps of placing a flexible ring member between the first and second seal surfaces and juxtaposing the first and second seal surfaces. The flexible ring member is compressed between the first and second seal surfaces. Thereafter, the flexible ring member is expanded into at least one of a first recessed area in the first seal surface and a second recessed area in the second seal surface, with at least one of the first and second recessed areas having a plurality of spaced apart pressure points that contact the ring member. This method of sealing assures that when the O-ring (flexible ring) permanently sets over time, it takes the shape that makes the seal effective for a long time under high temperature, high pressure.

18 Claims, 4 Drawing Sheets

RECESSED GROOVE/SEAL SURFACE FOR SEAL EFFECTIVENESS

BACKGROUND OF THE INVENTION

The present invention generally relates to apparatus and methods of sealing surfaces to one another. More particularly, the present invention relates to apparatus and methods that allow for the use of standard O-rings that can seal static surfaces under changing conditions such as high temperature and pressure exposure.

In a variety of environments, two static surfaces oftentimes need to be sealed to one another. For example, compressors in vapor cycle systems of environmental control systems need to be hermetically sealed to prevent the escape of refrigerants. Currently, elastomer O-rings provide hermetic seals but they permanently set after exposure to high temperature and clamp load during operation. Consequently, refrigerant leakage occurs after a relatively short period of time. Leakage is aggravated by the movement of mating sealing surfaces when the compressor is under temperature and pressure. Of course, leakage leads to less than optimal performance. And the need to change O-rings leads to higher maintenance costs.

Numerous efforts have been made to improve sealing between static surfaces and between dynamic surfaces. One example of an effort to seal pipes inserted into holes in members such as manholes is found in U.S. Pat. No. 4,199,157. To prevent seal blowout, a two part sleeve gasket fits between the pipe and the hole. A first part of the gasket includes a tubular body portion that contacts the pipe and an outwardly curved flange radially spaced from the body portion and that contacts the hole. The second part of the gasket includes an O-ring that surrounds the body portion in the radial space defined by the flange. The cross-section of the O-ring is greater than the free radial space between the flange and the body portion so that the flange and body portion are expanded into engagement with the pipe and hole. A disadvantage to this design is its complexity, as well as the need for multiple parts. This design requires a specially shaped component that will be more expensive to fabricate compared to a standard O-ring seal. Also, this design will eventually leak when the elastomeric component permanently sets under pressure and/or temperature over time.

Another example of attempting to prevent seal blowout in the context of sealing a cylinder within a bore is found in U.S. Pat. No. 5,603,511. A seal element is moved from one axial position, up a ramp, and to a second axial position. In the second position, the seal assembly expands to contact the inside of the bore. An anti-extrusion element also contacts the inside of the bore and the seal element to prevent blowout of the seal element. The complex design of having to move the seal, however, presents a disadvantage and would not be practical to employ in varying applications. Specially designed components and complexity of assembly also make this design expensive and cumbersome to use, especially if the part needs to be reworked and the seal replaced.

In U.S. Pat. No. 4,614,348, a two component seal is provided for a fluid coupling in a pressurized fluid system having male and female parts. The male part includes a recess having a somewhat rectangular configuration. One part of the seal is an annular body having a U-shaped cross-section that defines a recess. The annular body fits within the recess of the male part such that the two extended portions of the annular body face towards the male part. The second part of the seal is an O-ring that fits within the recess of the annular body. Thereby, the O-ring sealingly engages the recess of the male part. Again, a disadvantage to this design is its complexity, the need for multiple parts, and the absence of addressing the effects of seal permanent set. Also, multiple parts and the use of specially shaped components make this part expensive.

FIG. 1 depicts a prior art design found, for example, in a compressor 10. For purposes of illustration, the compressor 10 may include a first component 11 and a second component 12 that interface one another. The first component 11 includes a first seal surface 13 and the second component 12 includes a second seal surface 14. With the first and second components juxtaposed to one another, a leakage inlet 15 may allow pressure to pass between the components 11, 12 and exit through a leakage outlet 16. To prevent such leakage, the first component 11 has a recess 17 with a substantially rectangular cross section. Accordingly, each of the walls of the recess 17 is substantially planar. An O-ring 18 is disposed in the recess to block the flow of pressure from the leakage inlet 15 and to the leakage outlet 16. As described above, however, this design is susceptible to pressure leakage over time, particularly when the compressor 10 is subject to high pressure, high temperature, and movement of the first and second seal surfaces 13, 14.

A variation of the design in FIG. 1 is shown in U.S. Pat. No. 4,477,223 for a rotating shaft within a bore of a compressor. A non-rotating ring is disposed between the shaft and bore. An annular recess in the ring has an arcuate cross section. The annular recess interfaces a recess in the bore and has a rectangular cross section. An O-ring is held between the two recesses where one of the recesses is offset to deform the ring causing it to exert an axial force on a non-rotating cylinder against a rotating ring. This seal arrangement uses the O-ring to force a stationary part against a rotating part to effect the seal between the stationary and rotating parts. Furthermore, it does not take into consideration the eventual setting of the O-ring which will eventually render the seal ineffective.

As can be seen, there is a need for an improved apparatus and method of sealing surfaces together. A further need is for an apparatus and method that not only provides sealing but is simple in design and minimizes manufacturing costs. Yet another need is for an apparatus and method that can be implemented into existing components with limited changes to the design of such components. A still further need is for an improved method and apparatus that prevents leakage between mating surfaces over extended periods of time. An apparatus and method are needed that can block leakage between mating surfaces under conditions of high pressure, high temperature and movement of the mating surfaces.

SUMMARY OF THE INVENTION

In one aspect of the present invention, a method of sealing at least a first seal surface to a second seal surface comprises the steps of placing a flexible ring member between the first and second seal surfaces; juxtaposing the first and second seal surfaces; and creating a plurality of spaced apart pressure points in the first and second seal surfaces such that the pressure points contact the ring member.

In another aspect of the present invention, a seal surface for interfacing a flexible ring member comprises a recessed area having a plurality of recesses into which the ring member can expand; and a plurality of spaced apart pressure points in said recesses that contact the ring member.

These and other features, aspects and advantages of the present invention will become better understood with reference to the following drawings, description and claims.

BRIEF DESCRIPTION OF THE DRAWINGS

FIG. 2b is a cross-sectional view of a first embodiment of the present invention shown in FIG. 2a;

FIG. 2c is a cross-sectional view of a second embodiment of the present invention shown in FIG. 2a;

DETAILED DESCRIPTION OF THE INVENTION

While the present invention is described in the context of a compressor, the invention is not intended to be so limited. Rather, the present invention may be useful in the general context of two or more seal surfaces. Typically, the seal surfaces will be static. For example, the apparatus and method of the present invention may be used in pressurized vessels to prevent the escape of pressure or in components/systems containing two or more separate fluids/mediums to prevent them from mixing together.

Figure 2A:
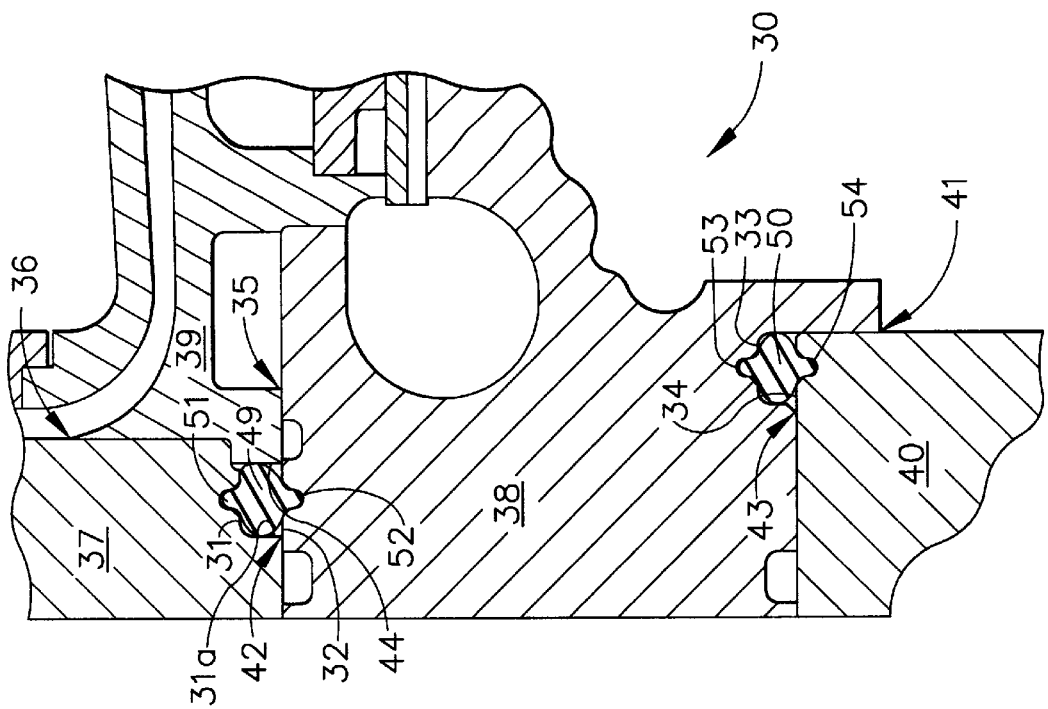
FIG. 2a is a cross-sectional view of two embodiments of the present invention in the context of a compressor.

FIG. 2a depicts a cross-sectional view of a portion of a device or compressor 30. For purposes of illustration, the compressor 30 includes a first component 37, a second component 38, a third component 39, and fourth component 40, all of which are juxtaposed to one another at various seal surfaces. The first component 37 includes a seal surface 31 subtended by a wall surface 31a; the second component 38 includes seal surfaces 32, 33; the third component 39 includes a wall surface 44, and the fourth component 40 includes a seal surface 34. The seal surface 31 mates to the seal surface 32. The seal surface 33 mates to the seal surface 34.

With the first, second, third, and fourth components 37–40 juxtaposed, and again for purposes of illustration, leakage inlets 35 and 36 are respectively created between second and third components 38, 39 and between first and third components 37, 39. A pressurized fluid from within the compressor 30 may enter the leakage inlets 35 and 36, and then exit the compressor 30 through a leakage outlet 42. A leakage inlet 41 between the second and fourth components 38, 40 can allow pressure leakage out of a leakage outlet 43.

In still referring to FIG. 2a, pressure leakage out of the leakage outlet 42 is prevented, in part, by a flexible ring member or O-ring 49. The O-ring 49 is disposed in a recessed area described below to block the flow/pressure escape from the leakage inlets 35 and 36 to the leakage outlet 42. The O-ring 49 is of any well known, simple design and can be made of flexible materials such as neoprene, nitrile, viton or rubber. Likewise, leakage out of the leakage outlet 43 is prevented, in part, by a flexible ring member or O-ring 50.

Figure 2B:
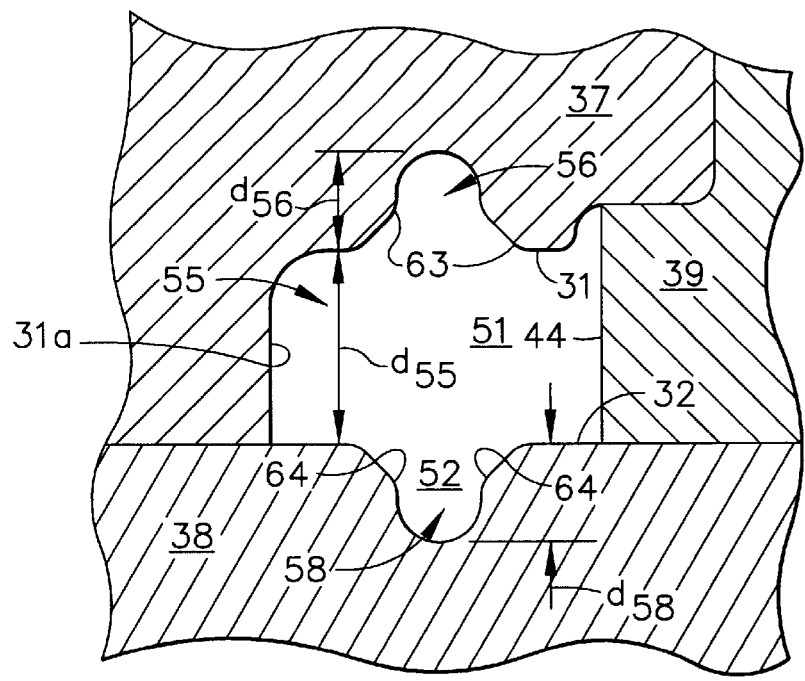

As better seen in FIG. 2b, and in one embodiment of the present invention, the seal surface 31 of the first component 37, the seal surface 32 of the second component 38, the wall 31a subtending the seal surface 31, and the external wall surface 44 of the third component 39 surround the O-ring 49. In contrast to the prior art which has one recess area and one planar seal surface, the first component 37 comprises a recessed area 51 having a plurality of recesses or recessed sections 55, 56, together with a divided seal surface 31 (i.e., divided by recess 56). In other words, the recesses 55, 56 are within a larger recess 51. The recess 55 has a substantially rectangular cross-section in this embodiment and is characterized by a cross-sectional recess dimension $d_{55}$ that is less than the cross-sectional dimension of the O-ring 49. The recess 56 has a partially arcuate cross-section in this embodiment and is characterized by a cross-sectional recess dimension $d_{56}$ that is less than the cross-sectional dimension of the O-ring 49.

In still referring to FIG. 2b, it can be seen that the creation of the recessed area 51 provides a plurality of spaced apart pressure points 63 that contact the O-ring 49. This is in contrast to the prior art which provided an expanded surface area that was typically planar or, in other words, contiguous pressure points that contacted an O-ring. The pressure points 63 are spaced apart so that the O-ring 49 can expand between the points 63 and, thereby, create specific points at which pressure leakage is blocked. For example, the O-ring 49 may expand into the recessed section 56 and specifically between the pressure points 63 when the seal 49 is compressed by seal surfaces 31, 32.

Similarly, the seal surface 32 of the second component 38 is configured with a recessed area 52. However, unlike the recessed area 51, the recessed area 52 only includes a single recess or recessed section 58 that is of a configuration similar to the recess 56. The recessed section 58 is characterized by a cross-sectional recess dimension $d_{58}$ that is less than the cross-sectional dimension of the O-ring 49. The recessed section 58 provides a plurality of spaced apart pressure points 64 that function in a fashion similar to the pressure points 63. Recessed section 58 functions in conjunction with recessed section 56.

In contrast to the seal surfaces 31, 32, it can be seen in FIG. 2b that the external wall surface 44 is not configured with a recessed area. However, the present invention contemplates that the wall surface 44 can include a recessed area. Therefore, and in accordance with the present invention, not all of the surfaces that contact the O-ring need to have recessed areas. The total volume created by recessed areas 51, 52 is equal to the volume of the current standard O-ring groove configuration.

Figure 2C:
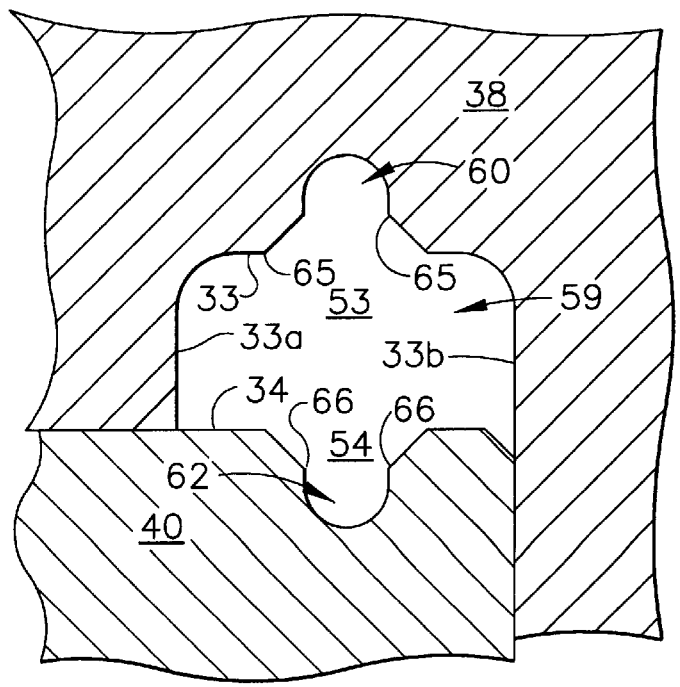

FIG. 2c depicts a second embodiment of the present invention wherein the seal surface 33 of the second component 38, the sidewalls 33a, 33b subtending the seal surface 33, and the seal surface 34 of the fourth component 40 surround the O-ring 50. Again in contrast to the prior art having one recess area with one planar seal surface, the second component 38 comprises a recessed area 53 having a plurality of recesses or recessed sections 59, 60, together with a divided seal surface 33 (i.e., divided by recess 60). The recess 59 has a substantially rectangular cross-section and a cross-sectional dimension that is less than the cross-sectional dimension of the O-ring 50. The recess 60 is configured and dimensioned similar to the recess 56, although the configurations and dimensions between the recesses 56, 60 can be different. As with the above embodiment, the recessed area 53 provides a plurality of spaced apart pressure points 65 that contact the O-ring 50.

In this second embodiment, the seal surface 34 of the fourth component 40 is configured with a recessed area 54 having a single recess or recessed section 62. The recessed section 62 is configured and dimensioned similar to the recessed section 60. However, different configurations and dimensions can be used for the recessed section 60, 62. The recessed area 54 further includes a plurality of spaced apart pressure points 66.

Figure 3:
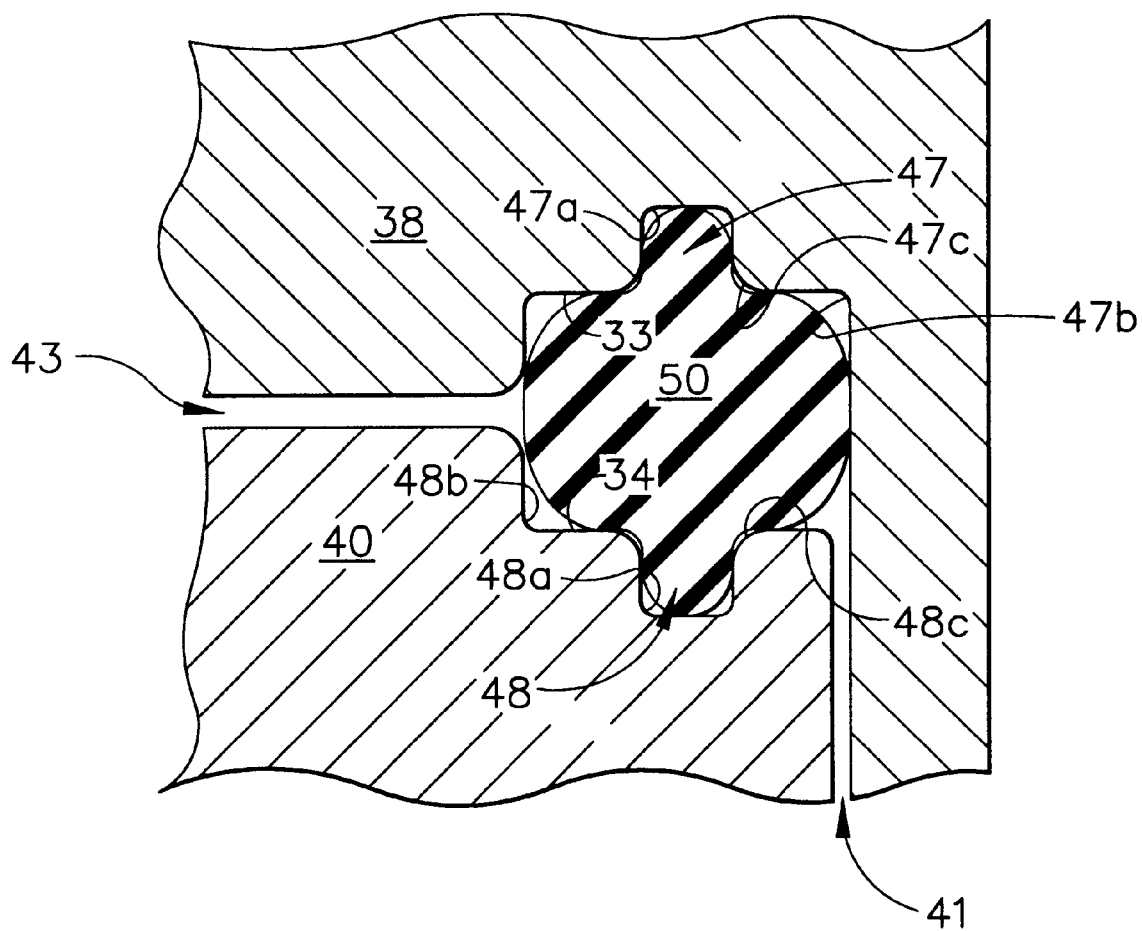
FIG. 3 is a cross-sectional view of a third embodiment of the present invention.

A third embodiment of the present invention is shown in FIG. 3 which is similar to the second embodiment but with a different configuration for the recessed areas. The second component 38 is juxtaposed to the fourth component 40 to create the leakage inlet 41 and the leakage outlet 43. The seal surface 33 of the second component 38 provides a recessed area 47 having a plurality of recesses or recessed sections 47a, 47b. The recesses 47a, b are rectangular in configuration and each has a cross-sectional dimension that is less than the cross-sectional dimension of the O-ring 50. The recessed area 47 further includes a plurality of separated pressure points 47c. Similarly, the seal surface 34 of the fourth component 40 provides a recessed area 48 having plurality of recesses or recessed sections 48a, 48b, and a plurality of pressure points 48c.

While the above describes certain embodiments of the present invention, it should be understood that the scope of the invention is not so limited. For example, the seal surfaces (33 or 34) may include more than two recesses with spaced apart pressure points. The recesses (55–62) may have the same or dissimilar configurations, as well as configurations other than rectangular or partially arcuate, such as triangular or irregularly shaped polygon. The number of pressure points (63–66) can also vary, as well as the distance between them. The pressure points are preferably not sharp and may either be broken edge/champered or rounded corner.

In view of the above, it can also be seen that the present invention involves a method of sealing at least two seal surfaces together. An O-ring (49, 50) is placed between a first seal surface (31, 33) and a second seal surface (32, 34). The first and second seal surfaces (31–34) are then juxtaposed to one another. The O-ring (49, 50) is compressed in recess areas 55, 59, 47b and 48b, and then allowed to expand into at least one of the smaller recessed areas (56, 58, 60, 62, 47a, 48a) provided by the first and second seal surfaces (31–34). More specifically, the O-ring expands into at least one recess (56, 58, 60, 62, 47a, 48a) within the recessed areas. Further, the O-ring (49, 50) expands between separated pressure points (63–66) and contacts the O-ring. By such contact, the O-ring (49, 50) is retained within the recesses (55–62).

EXAMPLES

Figure 1:
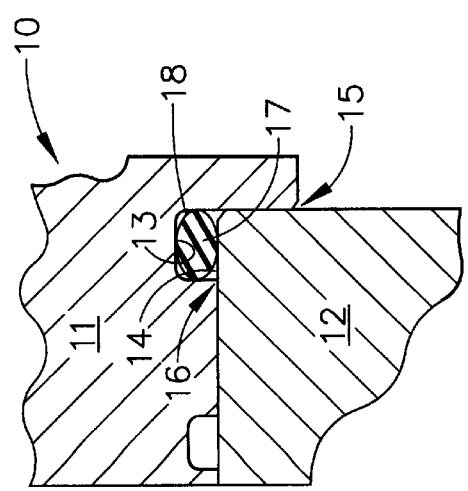
FIG. 1 is a cross-sectional view of a prior art design of using an O-ring between mating surfaces.
Figure 4:
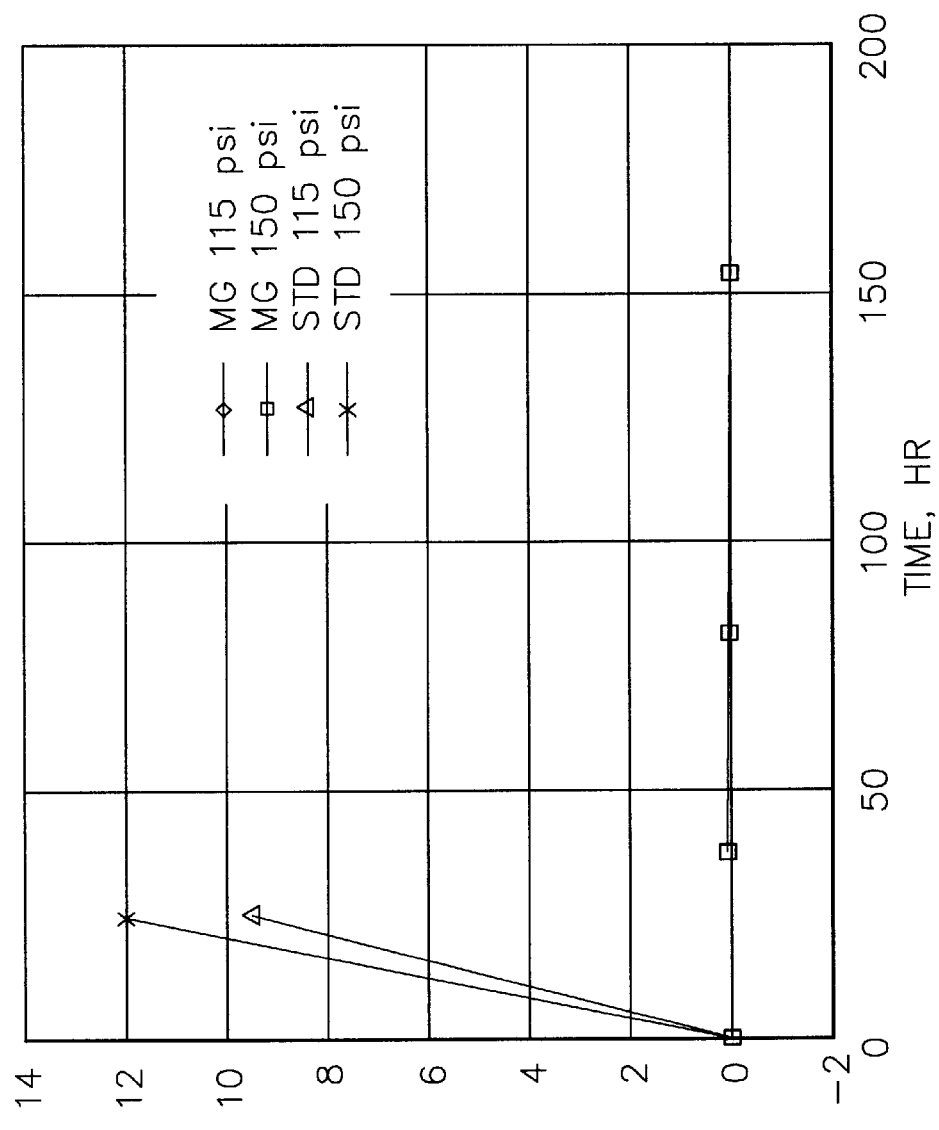
FIG. 4 is a graph of leak rate versus time for the prior art design of FIG. 1 and the present invention.

FIG. 4 depicts the performance of the present invention as compared to a prior art design. The embodiments shown in FIGS. 2b, 2c and 3 were compared to the design shown in FIG. 1. The present invention and the prior art design were subjected to pressures at 115 and 150 psi. FIG. 4 indicates that the prior art design had much greater leak than the present invention after 25 hours at pressure, and the present invention continued to have no leak after over 150 hours (with the graph lines for the present invention overlaying one another).

As can be appreciated by those skilled in the art, the present invention provides an apparatus and method that not only provides sealing but is simple in design and minimizes manufacturing costs. The present invention can be implemented into existing components with limited changes to the design of such components. It also prevents leakage between mating surfaces over extended periods of time. The present invention can also block leakage between mating surfaces under conditions of high pressure, high temperature and movement of the mating surfaces.

It should be understood, of course, that the foregoing relates to preferred embodiments of the invention and that modifications may be made without departing from the spirit and scope of the invention as set forth in the following claims.

We claim:

1. A method of sealing at least a first seal surface to a second seal surface, comprising the steps of providing a recessed area in said first seal surface, said recessed area comprising a first divided seal surface divided by at least one recessed section, wherein each of said recessed sections has a plurality of spaced apart pressure points, and wherein said recessed area is larger than each of said recessed sections;

providing said second seal surface comprising a second divided seal surface divided by at least one of said recessed sections, wherein each of said recessed sections has at least one plurality of said spaced apart pressure points;

placing a flexible ring member between said first and second seal surfaces;

juxtaposing said first and second seal surfaces in compression;

compressing said flexible ring member in said larger recessed area between said first and second seal surfaces; and expanding said flexible ring member into at least one of said recessed sections in each of said first and second divided seal surfaces so that at least one of said plurality of spaced apart pressure points in each of said seal surfaces contacts said flexible ring member.

2. The method of claim 1, further comprising the step of providing a plurality of recessed sections in at least one of said first and second seal surfaces.

3. The method of claim 1, further comprising the step of creating a plurality of spaced apart pressure points in said first and second seal surfaces such that said pressure points contact said ring member.

4. The method of claim 1, wherein said recessed sections in each of said first and second seal surfaces have the same configuration.

5. The method of claim 1, wherein said recessed sections in each of said first and second seal surfaces have different configurations.

6. The method of claim 1, wherein a portion of at least one of said recessed sections in each of said first and second seal surfaces has a substantially rectangular configuration.

7. The method of claim 1, wherein a portion of at least one of said recessed sections in each of said first and second seal surfaces has a substantially arcuate configuration.

8. A method of sealing at least a first seal surface to a second seal surface, comprising the steps of providing said first seal surface comprising a first divided seal surface divided by at least one recessed section, wherein each of said recessed sections has a plurality of spaced apart pressure points, and wherein each of said recessed sections has a cross-sectional recess dimension that is less than a cross-sectional ring dimension of a flexible ring member;

providing said second seal surface comprising a second divided seal surface divided by at least one recessed section, wherein each of said recessed sections has a plurality of spaced apart pressure points, and wherein each of said recessed sections has a cross-sectional recess dimension that is less than a cross-sectional ring dimension of said flexible ring member;

placing said flexible ring member between said first and second seal surfaces;

juxtaposing said first and second seal surfaces in compression so as to compress said flexible ring member between at least one of said pluralities of spaced apart pressure points of said first divided seal surface and at least one of said pluralities of spaced apart pressure points of said second divided seal surface; and expanding said flexible ring member into at least one of said recessed sections of said first seal surface and into at least one of said recessed sections of said second seal surface.

9. The method of claim 8, further comprising the step of creating a plurality of spaced apart pressure points in said first and second seal surfaces such that said pressure points contact said ring member.

10. The method of claim 8, further comprising the step of expanding said ring member into said recessed sections in said first and second seal surfaces.

11. The method of claim 8, wherein each of said recessed sections in said first seal surface is part of a first recessed area in a first interfacing component and each of said recessed sections in said second seal surface is part of a second recessed area in another interfacing component.

12. The method of claim 11, wherein at least one of said recessed sections in said first and second seal surfaces has a substantially rectangular cross-section.

13. The method of claim 11, wherein at least one of said recessed sections in said first and second seal surfaces has a substantially triangular cross-section.

14. The method of claim 11, wherein at least one of said recessed sections in said first and second seal surfaces has a partially arcuate configuration.

15. A seal surface for interfacing a flexible ring member, comprising:

a divided seal surface including a recessed area in said divided seal surface and into which recessed area said ring member can expand;

a plurality of spaced apart pressure points in said divided seal surface adapted for contacting said ring member in compression; and, wherein said divided seal surface comprises a plurality of recessed areas.

16. The seal surface of claim 15, wherein a portion of said recessed area has a substantially rectangular configuration.

17. The seal surface of claim 15, wherein a portion of said recessed area has a substantially triangular configuration.

18. The seal surface of claim 15, wherein a portion of said recessed area has a substantially arcuate configuration.

* * * * *